US012764260B2

(12) United States Patent
Choi et al.

(10) Patent No.: US 12,764,260 B2
(45) Date of Patent: Oct. 13, 2026

(54) ELECTRONIC APPARATUS FOR COMPENSATING EXTERNAL AREAS RESULTING FROM KEYSTONE CORRECTION AND CONTROLLING METHOD THEREOF

(71) Applicant: Samsung Electronics Co., Ltd., Suwon-si (KR)

(72) Inventors: Eunseok Choi, Suwon-si (KR); Sungho Chae, Suwon-si (KR); Taehee Weon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/944,827

(22) Filed: Nov. 12, 2024

(65) Prior Publication Data

US 2025/0193354 A1 Jun. 12, 2025

Related U.S. Application Data

(63) Continuation of application No. PCT/KR2024/016480, filed on Oct. 25, 2024.

(30) Foreign Application Priority Data

Dec. 7, 2023 (KR) ........................ 10-2023-0176701

(51) Int. Cl.
*H04N 9/31* (2006.01)

(52) U.S. Cl.
CPC ......... *H04N 9/3185* (2013.01); *H04N 9/3182* (2013.01); *H04N 9/3194* (2013.01)

(58) Field of Classification Search
CPC .. H04N 9/3182; H04N 9/3185; H04N 9/3194; H04N 9/31; H04N 9/3188; G03B 21/147; G03B 21/13
See application file for complete search history.

(56) References Cited

U.S. PATENT DOCUMENTS 6,520,647 B2 2/2003 Raskar
7,144,115 B2 12/2006 Li
(Continued)

FOREIGN PATENT DOCUMENTS

CN 104658349 5/2015
CN 110809143 A * 2/2020 ........... H04N 9/3141
(Continued)

OTHER PUBLICATIONS

International Search Report and Written Opinion dated Feb. 13, 2025 issued in International Application No. PCT/KR2024/016480.

*Primary Examiner* — John W Miller
*Assistant Examiner* — Humam M Satti
(74) *Attorney, Agent, or Firm* — NIXON & VANDERHYE P.C.

(57) ABSTRACT

An electronic apparatus is provided. The electronic apparatus includes: a projector configured to project an image with a specified resolution, a camera, and at least one processor, comprising processing circuitry, connected to the projector and the camera and configured to control the electronic apparatus, wherein at least one processor, individually and/or collectively, is configured to: perform keystone correction for a first image, control the projector to project an image of the specified resolution in which the keystone-corrected first image is included in one area and a second image is included in a remaining area to a projection area, obtain a captured image by photographing the projection area and an external area of the projection area through the camera, adjust a pixel value of the second image based on first pixel information corresponding to the remaining area in the captured image and second pixel information corresponding to the external area of the projection area, and control the projector to project an image of the specified resolution in which the keystone-corrected first image is included in the one area
(Continued)

and the second image with the adjusted pixel value is included in the remaining area to the projection area.

15 Claims, 8 Drawing Sheets

(56) References Cited

U.S. PATENT DOCUMENTS

| | | | | |
|---|---|---|---|---|
| 8,714,746 | B2 | 5/2014 | Choi et al. | |
| 8,994,714 | B2 | 3/2015 | Erinjippurath et al. | |
| 11,520,216 | B2 | 12/2022 | Cheng | |
| 2004/0041985 | A1* | 3/2004 | Kimura ................ | G03B 21/005<br>353/70 |
| 2017/0257608 | A1 | 9/2017 | Ikeda et al. | |
| 2020/0081329 | A1* | 3/2020 | Cheng .................. | H04N 9/3182 |
| 2024/0129423 | A1* | 4/2024 | Nishimori ............ | H04N 9/3194 |

FOREIGN PATENT DOCUMENTS

| | | | |
|---|---|---|---|
| JP | 2000010185 | A | 1/2000 |
| JP | 2005-039593 | | 2/2005 |
| JP | 2006-201425 | A | 8/2006 |
| JP | 2009217462 | A | 9/2009 |
| JP | 4774826 | B2 | 7/2011 |
| JP | 2016-57343 | A | 4/2016 |
| JP | 2017-156581 | A | 9/2017 |
| KR | 10-2014-0063536 | A | 5/2014 |
| KR | 10-2022-0152112 | A | 11/2022 |
| KR | 20230020798 | A | 2/2023 |

* cited by examiner

ELECTRONIC APPARATUS FOR COMPENSATING EXTERNAL AREAS RESULTING FROM KEYSTONE CORRECTION AND CONTROLLING METHOD THEREOF

CROSS-REFERENCE TO RELATED APPLICATIONS

This application is a continuation of International Application No. PCT/KR2024/016480 designating the United States, filed on Oct. 25, 2024, in the Korean Intellectual Property Receiving Office and claiming priority to Korean Patent Application No. 10-2023-0176701, filed on Dec. 7, 2023, in the Korean Intellectual Property Office, the disclosures of each of which are incorporated by reference herein in their entireties.

BACKGROUND

Field

The disclosure relates to an electronic apparatus and a controlling method thereof, and for example, to an electronic apparatus for compensating an external area resulting from keystone correction and a controlling method thereof.

Description of Related Art

With the development of electronic technology, electronic apparatuses that provide various functions are being developed. In particular various types of projectors have been popularized these days.

A projector is a device that projects an image, and by projecting light onto a projection area to implement an image, it has the advantage of being able to easily implement a large screen compared to other types of display devices.

Recently, projectors that offer keystone correction have become popularized, improving user convenience.

SUMMARY

An electronic apparatus according to an example embodiment includes: a projector configured to project an image with a specified resolution, a camera, and at least one processor, comprising processing circuitry, connected to the projector and the camera and individually and/or collectively configured to control the electronic apparatus, and at least one processor, individually and/or collectively, is configured to: perform keystone correction for a first image, control the projector to project an image of the specified resolution in which the keystone-corrected first image is included in one area and a second image is included in a remaining area to a projection area, obtain a captured image including a photograph of the projection area and an external area of the projection area through the camera, adjust a pixel value of the second image based on first pixel information corresponding to the remaining area in the captured image and second pixel information corresponding to the external area of the projection area, and control the projector to project an image of the specified resolution in which the keystone-corrected first image is included in the one area and the second image with the adjusted pixel value is included in the remaining area to the projection area.

The image may be an image of a specified color, and at least one processor, individually and/or collectively, may be configured to adjust a pixel value of the second image such that a difference between the first pixel information and the second pixel information is less than a threshold value.

At least one processor, individually and/or collectively, may be configured to: obtain the captured image including a photograph of the projection area and the external area through the camera at a specified time interval, adjust a pixel value of the second image based on the first pixel information corresponding to the remaining area and the second pixel information corresponding to the external area in each of a plurality of captured images obtained at the specified time interval, and based on a difference between the first pixel information and the second pixel information being less than a threshold value, stop obtaining the captured image and adjusting the pixel value.

At least one processor, individually and/or collectively, may be configured to identify a pattern corresponding to the external area of the projection area in the captured image, and adjust a pixel value of the second image based on the identified pattern.

At least one processor, individually and/or collectively, may be configured to adjust a pixel value of the second image based on at least one of luminance or color of the keystone-corrected image.

The apparatus may further include a sensor, and at least one processor, individually and/or collectively, may be configured to: obtain sensing information including ambient illuminance of the electronic apparatus through the sensor, and adjust a pixel value of the second image based on the sensing information.

The apparatus may further include a sensor, and at least one processor, individually and/or collectively, may be configured to: obtain sensing information including an angle at which the electronic apparatus is rotated with reference to a direction of gravity and an angle at which the electronic apparatus is rotated with reference to the projection area through the sensor, and perform the keystone correction for the first area by changing a shape of the first image based on the sensing information.

The apparatus may further include a user interface, and at least one processor, individually and/or collectively, may be configured to adjust a pixel value of the second image based on a color corresponding to a user command received through the user interface.

The projection area may be an area to which light emitted from the projector is projected.

A method of controlling an electronic apparatus according to an example embodiment includes: performing keystone correction for a first image, projecting an image with a specified resolution in which the keystone-corrected first image is included in one area and a second image is included in a remaining area to a projection area, obtaining a captured image including a photograph of the projection area and an external area of the projection area, adjusting a pixel value of the second image based on first pixel information corresponding to the remaining area in the captured image and second pixel information corresponding to the external area of the projection area, and projecting an image of the specified resolution in which the keystone-corrected first image is included in the one area and the second image with the adjusted pixel value is included in the remaining area to the projection area.

The image may be an image of a specified color, and the adjusting may include adjusting a pixel value of the second image such that a difference between the first pixel information and the second pixel information is less than a threshold value.

The obtaining may include obtaining the captured image including a photograph of the projection area and the external area at a specified time interval, and the adjusting may include adjusting a pixel value of the second image based on the first pixel information corresponding to the remaining area and the second pixel information corresponding to the external area in each of a plurality of captured images obtained at the specified time interval, and the method may further include, based on a difference between the first pixel information and the second pixel information being less than a threshold value, stopping obtaining the captured image and adjusting the pixel value.

The method may further include identifying a pattern corresponding to the external area of the projection area in the captured image, and the adjusting may include adjusting a pixel value of the second image based on the identified pattern.

The adjusting may include adjusting a pixel value of the second image based on at last one of luminance or color of the keystone-corrected image.

The method may further include obtaining sensing information including ambient illuminance of the electronic apparatus, and the adjusting may include adjusting a pixel value of the second image based on the sensing information.

The method may further include obtaining sensing information including an angle at which the electronic apparatus is rotated with reference to a direction of gravity and an angle at which the electronic apparatus is rotated with reference to the projection area, and performing the keystone correction for the first area by changing a shape of the first image based on the sensing information.

The adjusting may include adjusting a pixel value of the second image based on a color corresponding to a user command.

The projection area may be an area to which light emitted from the projector is projected.

According to an example embodiment, in a non-transitory computer-readable recording medium may have stored thereon a program which, when executed by at least one processor of an electronic apparatus, individually and/or collectively, cause the electronic apparatus to perform operations comprising: performing keystone correction for a first image, projecting an image with a specified resolution in which the keystone-corrected first image is included in one area and a second image is included in a remaining area to a projection area, obtaining a captured image including a photograph of the projection area and an external area of the projection area, adjusting a pixel value of the second image based on first pixel information corresponding to the remaining area in the captured image and second pixel information corresponding to the external area of the projection area, and projecting an image of the specified resolution in which the keystone-corrected first image is included in the one area and the second image with the adjusted pixel value is included in the remaining area to the projection area.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
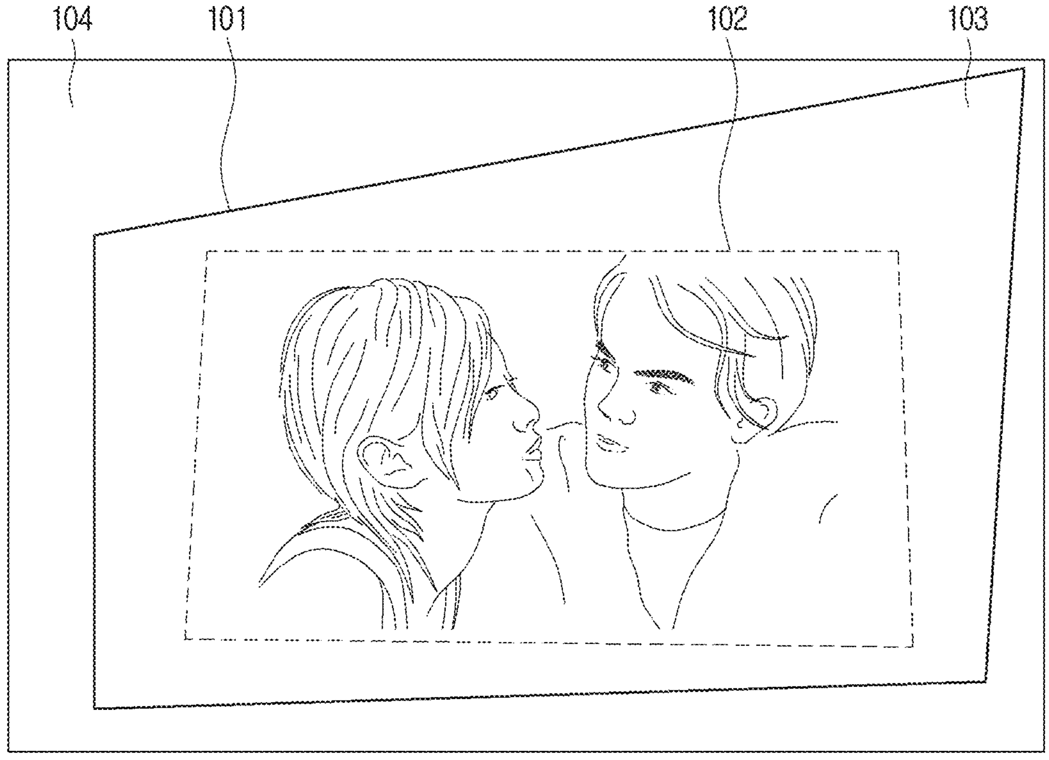
FIG. 1 is a diagram illustrating example keystone correction of an image to aid in understanding of the present disclosure.

Various example embodiments of the present disclosure may be diversely modified. Accordingly, various example embodiments are illustrated in the drawings and are described in detail in the detailed description. However, it is to be understood that the present disclosure is not limited to a specific embodiment, but includes all modifications, equivalents, and substitutions without departing from the scope and spirit of the present disclosure. Also, well-known functions or constructions may not be described in detail if they would obscure the disclosure with unnecessary detail.

The present disclosure provides an electronic apparatus for minimizing and/or reducing a user's sense of heterogeneity by compensating an external area resulting from keystone correction and a controlling method thereof.

Hereinafter, the present disclosure will be described in greater detail with reference to the accompanying drawings.

General terms that are currently widely used are selected as the terms used in the embodiments of the disclosure in consideration of their functions in the disclosure, but the terms may be changed based on the intention of those skilled in the art or a judicial precedent, the emergence of a new technique, or the like. In addition, in a specific case, terms may be arbitrarily chosen. In this case, the meanings of such terms are mentioned in detail in the corresponding descriptions of the disclosure. Therefore, the terms used in the embodiments of the disclosure are defined on the basis of the meanings of the terms and the overall contents throughout the disclosure rather than simple names of the terms.

In the disclosure, an expression "have", "may have", "include", "may include" or the like, indicates the existence of a corresponding feature (e.g., a numerical value, a function, an operation or a component such as a part), and does not exclude the existence of an additional feature An expression, "at least one of A or/and B" should be understood as indicating any one of "A", "B" and "both of A and B."

Expressions "1st", "2nd", "first", "second", and the like, used in the disclosure may indicate various components regardless of the sequence and/or importance of the components, and these expressions are used only to distinguish one component from another component, and do not limit the corresponding components.

A term of a singular form may include its plural form unless explicitly indicated otherwise in the context. It is to be understood that a term "include", "formed of", or the like used in the application specifies the presence of features, numerals, steps, operations, components, parts, or combinations thereof, mentioned in the disclosure, and does not preclude the presence or addition of one or more other features, numerals, steps, operations, components, parts, or combinations thereof.

In the disclosure, a term 'user' may refer to a person using an electronic apparatus or a device (e.g., an artificially intelligent electronic apparatus) using an electronic apparatus.

Hereinafter, various example embodiments of the present disclosure will be described in greater detail with reference to the accompanying drawings.

FIG. 1 is a diagram illustrating keystone correction of an image to aid in understanding of the present disclosure.

When a projector is placed upright on a flat surface in the direction of a screen, a rectangular image may be displayed on the screen. On the other hand, when the projector is not placed upright on a flat surface in the direction of the screen, the image distorted up and down, right and left, or the image in a rotated state may be displayed on the screen. This distortion is referred to as a keystone effect, and the function of removing such distortion is referred to as keystone correction.

For example, when the projector is not placed upright on a flat surface in the direction of the screen, a projection area such as area 101 in FIG. 1 may be formed. In other words, the projector may project an image into area 101. The projection area may be an area where light emitted from the projector is projected.

The projector may project the image to a projected image area 102 of the projection area 101 in FIG. 1 through keystone correction. However, even in this case, the light emitted from the projector may still be projected in the remaining area 103, excluding the projected image area 102, of the projection area 101. For example, the projector may project the remaining area 103, excluding the projected image area 102, in the projection area 101 as a black color. However, since the projector is a device that displays a color on the screen by a light source, even if black is projected, it may provide a sense of heterogeneity to the user. In other words, the user may feel a sense of heterogeneity due to the difference between the remaining area 103, excluding projected image area 102, in the projection area 101 and the external area 104 outside of the projection area.

Figure 2:
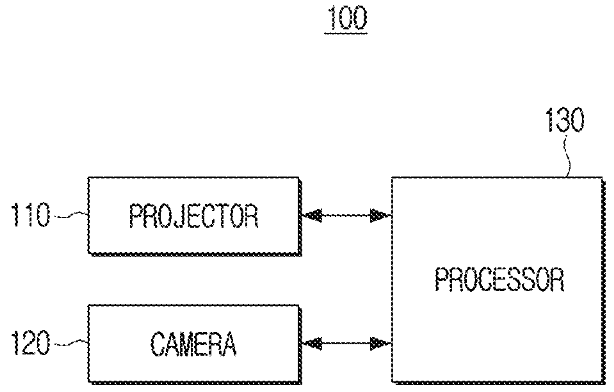
FIG. 2 is a block diagram illustrating an example configuration of an electronic apparatus according to various embodiments.

FIG. 2 is a block diagram illustrating an example configuration of an electronic apparatus 100 according to various embodiments.

The electronic apparatus 100 may be a device that projects content by changing the position of the electronic apparatus 100. For example, the electronic apparatus 100 may be a projector that is capable of self-moving.

The electronic apparatus 100 may be a device that provides an image to a screen. For example, the electronic apparatus 100 may be a projector with a keystone function.

Referring to FIG. 1, the electronic apparatus 100 includes a projector 110, a camera 120, and a processor (e.g., including processing circuitry) 130.

The projector 110 may project an image with a preset (e.g., specified) resolution to the projection surface. For example, the projector 110 may utilize a light source, such as a lamp or LED, to project an image or video including at least one of content received from a source device or pre-stored content to the projection area.

The camera 120 is configured to capture still images or moving images. The camera 120 may capture still images at a specific point in time, but may also capture still images continuously.

The camera 120 may photograph the front of the electronic apparatus 100 to capture an area where content is projected. The processor 130 may perform image processing based on the image captured through the camera 120.

The camera 120 may include, for example, a lens, a shutter, an aperture, a solid-state imaging device, an analog front end (AFE), and a timing generator (TG). The shutter controls the time when light reflected from a subject enters the camera 120, and the aperture controls the amount of light entering the lens by mechanically increasing or decreasing the size of the opening through which the light enters. When the light reflected from the subject is accumulated as a photoelectric charge, the solid-state imaging device outputs an image by the photoelectric charge as an electrical signal. The TG outputs a timing signal to read out the pixel data of the solid-state imaging device, and the AFE samples and digitizes the electrical signal output from the solid-state imaging device.

The processor 130 may include various processing circuitry and controls the overall operations of the electronic apparatus 100. For example, the processor 130 may be connected to each configuration of the electronic apparatus 100 to provide the overall operations of the electronic apparatus 100. For example, the processor 130 may be connected to the configuration, such as the projector 110, the camera 120, a sensor (not shown), a user interface (not shown), and the like to control the operations of the electronic apparatus 100.

The one or more processors 130 may include one or more of a central processing unit (CPU), a graphics processing unit (GPU), an accelerated processing unit (APU), a many integrated core (MIC), a neural processing unit (NPU), a hardware accelerator, or a machine learning accelerator. The one or more processors 130 may control one or any combination of the other components of the electronic apparatus 100, and may perform communication-related operations or data processing. The one or more processors 130 may execute one or more programs or instructions stored in memory. For example, the one or more processors 130 may perform a method according to an embodiment by executing one or more instructions stored in the memory.

When a method according to an embodiment includes a plurality of operations, the plurality of operations may be performed by one processor or by a plurality of processors. For example, when a first operation, a second operation, and a third operation are performed by the method according to an embodiment, all of the first operation, the second operation, and the third operation may be performed by the first processor, or the first operation and the second operation may be performed by the first processor (e.g., a general-purpose processor) and the third operation may be performed by the second processor (e.g., an artificial intelligence-dedicated processor).

The one or more processors 130 may be implemented as a single core processor comprising a single core, or as one or more multicore processors including a plurality of cores (e.g., homogeneous multicore or heterogeneous multicore). When the one or more processors 130 are implemented as multicore processors, each of the plurality of cores included in a multicore processor may include a processor internal memory, such as a cache memory and an on-chip memory, and a common cache shared by the plurality of cores may be included in the multicore processor. Further, each of the plurality of cores (or some of the plurality of cores) included in the multi-core processor may independently read and perform program instructions to implement the method according to an embodiment, or all (or some) of the plurality of cores may be coupled to read and perform program instructions to implement the method according to an embodiment.

When a method according to an embodiment includes a plurality of operations, the plurality of operations may be performed by one core of a plurality of cores included in a multi-core processor, or may be performed by a plurality of cores. For example, when a first operation, a second operation, and a third operation are performed by a method according to an embodiment, all of the first operation, the second operation, and the third operation may be performed by the first core included in the multi-core processor, or the first operation and the second operation may be performed by the first core included in the multi-core processor and the third operation may be performed by the second core included in the multi-core processor.

In various embodiments of the present disclosure, the one or more processors 130 may refer, for example, to a system-on-chip (SoC) in which one or more processors and other electronic components are integrated, a single-core processor, a multi-core processor, or a core included in a single-core processor or multi-core processor, and here, the core may be implemented as CPU, GPU, APU, MIC, NPU, hardware accelerator, or machine learning accelerator, etc., but the core is not limited to the various embodiments of the present disclosure. However, hereinafter, for convenience of explanation, the operation of the electronic apparatus 100 will be described using the term 'processor 130.' In other words, the processor 130 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

The processor 130 may perform keystone correction on the first image, and may control the projector 110 to project an image with a preset resolution in which the keystone-corrected first image is included in one area and the second image is included in the remaining area to the projection area. Here, the projection area may be an area to which light emitted from the projector 110 is projected.

For example, the processor 130 may perform keystone correction on the first image with a resolution of 1920×1080. In this case, the resolution of the keystone-corrected first image may be less than a resolution of 1920×1080. When the projector 110 projects an image with a 1920×1080 resolution, since an image with a 1920×1080 resolution is required, the processor 130 may control the projector 110 to obtain an image with a 1920×1080 resolution in which the keystone-corrected first image is included in one area and the second image is included in the remaining area, and project the obtained image to the projection area. The second image may be a black-colored image. However, the present disclosure is not limited thereto, and the second image may not be black, and may be an image of a preset color set at the time of manufacture. In addition, the first image may be an image scaled to a resolution that the projector 110 can output. For example, if the resolution that can be output by the projector 110 is a resolution of 1920×1080, and the original image has a 3840×2160 resolution, the processor 130 may downscale the original image to obtain a first image with a resolution of 1920×1080. Accordingly, when the first image is keystone-corrected, the resolution of the keystone-corrected first image may become smaller than the resolution that the projector 110 can output. Here, the downscaling may be performed on a frame-by-frame basis after decoding the original image.

When the image in which the keystone-corrected first image is included in one area and the second image is included in the remaining area is projected to the projection area, the first area corresponding to the first image in the projection area and the second area corresponding to the second image in the projection area may be distinguished. However, even if the projector 110 projects a black-colored image to the second area, the light of the projector 110 is not blocked, but light to represent the black color is projected to the second area, so the color of the second area may be different from the color of the external area of the projection area.

Since the user may feel a sense of heterogeneity due to the color difference, in order to reduce the sense of heterogeneity, the processor 130 may obtain a captured image by photographing the projection area and the external area of the projection area through the camera 120, adjust the pixel values of the second image based on the first pixel information corresponding to the remaining area and the second pixel information corresponding to the external area of the projection area in the captured image, and control the projector 110 to project an image in which the keystone-corrected first image is included in one area and the second image with the adjusted pixel value is included in the remaining area to the projection area.

For example, the preset image may include an image with a preset color, and the processor 130 may adjust the pixel value of the second image such that the difference between the first pixel information and the second pixel information is less than a threshold value, and may control the projector 110 to project an image with a preset resolution in which the keystone-corrected first image is included in one area and the second image with the adjusted pixel value is included in the remaining area to the projection area.

The processor 130 may repeat the above operations to reduce the difference between the second area and the external area of the projection area.

For example, the processor 130 may obtain a captured image that photographs the projection area and the external area through the camera 120 at a preset time interval, and adjust a pixel value of the second image based on the first pixel information corresponding to the projection area and the second pixel information corresponding to the external area in each of a plurality of captured images obtained at the preset time interval. The processor 130 may repeat this operation and, when the difference between the first pixel information and the second pixel information becomes less than a threshold value, stop obtaining the captured image and adjusting the pixel value.

The processor 130 may identify a pattern corresponding to the external area of the projection area in the captured image, and may adjust the pixel value of the second image based on the identified pattern. For example, if the screen includes a preset pattern, the external area of the projection area in the captured image may be represented by the preset pattern. The processor 130 may identify the preset pattern in the captured image, and may adjust the pixel value of the second image to include the preset pattern.

The processor 130 may adjust the pixel value of the second image by further considering (or further based on) at least one of luminance or color of the keystone-corrected image.

The electronic apparatus 100 may further include a sensor, and the processor 130 may obtain sensing information including ambient illumination of the electronic apparatus via the sensor, and may adjust the pixel value of the second image by further considering the sensing information.

The electronic apparatus 100 may further include a sensor, and the processor 130 may obtain sensing information via the sensor that includes an angle at which the electronic apparatus is rotated with reference to the direction of gravity and an angle at which the electronic apparatus is rotated with reference to the projection area, and perform keystone correction on the first image by changing the shape of the first image based on the sensing information.

The electronic apparatus 100 may further include a user interface, and the processor 130 may adjust the pixel value of the second image based on a color corresponding to a user command received via the user interface.

However, the present disclosure is not limited thereto, and the processor 130 may also perform at least one of keystone correction or adjustment of the pixel value of the second image based on a user command.

The processor 130 may recommend to the user a plurality of colors for adjusting the pixel value of the second image. For example, the processor 130 may obtain a pixel value for adjusting the pixel value of the second image based on the first pixel information corresponding to the remaining area in the captured image and the second pixel information corresponding to the external area of the projection area, and recommend a plurality of pixel values to the user by changing the obtained pixel value in a plurality of predetermined ways. The processor 130 may obtain the plurality of pixel values by changing at least one of a luminance or a white balance of the obtained pixel values.

The processor 130 may control the projector 110 to project a plurality of colors. The processor 130 may adjust the pixel value of the second image to a selected color in response to a user command that selects one of the plurality of colors.

However, the present disclosure is not limited thereto, and the electronic apparatus 100 may further include a display, and the processor 130 may control the display to display a plurality of colors. The processor 130 may provide a plurality of colors to a user terminal device and, upon receiving information from the user terminal device about a selected color as the user selects one of the plurality of colors using the user terminal device, adjust the pixel value of the second image to the selected color.

The processor 130 may also obtain color information for adjusting the pixel value of the second image by inputting the captured image into a neural network model. The neural network model may refer, for example, to a model that has learned a relationship between a sample photographing image and sample color information for adjusting the pixel value of the second image.

A function related to artificial intelligence according to the present disclosure may be operable via processor 130 and memory.

The processor 130 may include one or more processors. In this case, one or more processors may be general-purpose processors such as CPU, AP, or DSP, dedicated graphics processors such as GPU or Vision Processing Unit (VPU), or dedicated artificial intelligence processors such as NPU.

One or more processors may control input data to be processed according to predefined operation rules or artificial intelligence models stored in the memory. When one or more processors are dedicated artificial intelligence processors, the dedicated artificial intelligence processors may be designed with a hardware structure specialized for processing a specific artificial intelligence model. The predefined operation rules or artificial intelligence models are characterized by being created through training.

"Being created through training" may refer, for example, to the basic artificial intelligence model being trained using a large number of training data by a training algorithm and thus, predefined operation rules or artificial intelligence are set to perform the desired characteristics (or purpose). This training may be accomplished in the device itself that performs artificial intelligence according to the present disclosure, or may be accomplished through a separate server and/or system. Examples of training algorithms include, but are not limited to, supervised learning, unsupervised learning, semi-supervised learning, reinforcement learning, etc.

An artificial intelligence model may include a plurality of neural network layers. Each of the plurality of neural network layers may have a plurality of weight values, and neural network calculation is performed through calculation between the calculation result of the previous layer and the plurality of weights. The plurality of weights of the plurality of neural network layers may be optimized by the training results of the artificial intelligence model. For example, during the training process, the plurality of weights may be updated so that loss or cost values obtained from the artificial intelligence model are reduced or minimized.

The artificial neural network may include a deep neural network (DNN), for example, Convolutional Neural Network (CNN), Deep Neural Network (DNN), Recurrent Neural Network (RNN), Restricted Boltzmann Machine (RBM), Deep Belief Network (DBN), Bidirectional Recurrent Deep Neural Network (BRDNN), Generative Adversarial Network (GAN), Deep Q-Networks, etc., but is not limited thereto.

Figure 3:
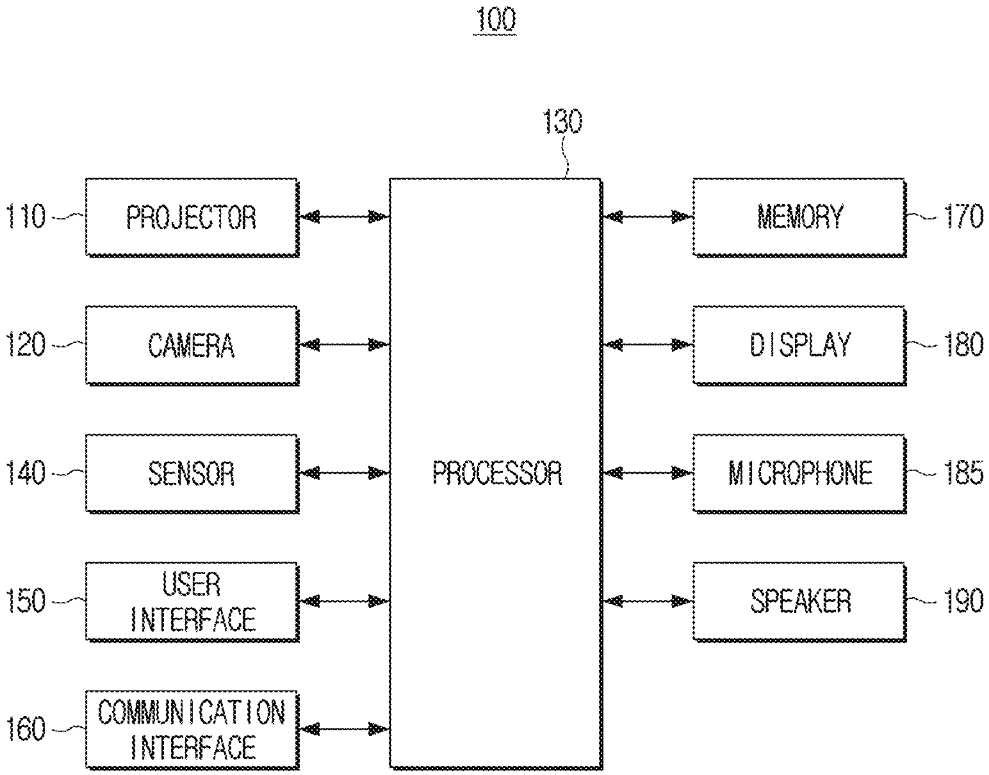
FIG. 3 is a block diagram illustrating an example configuration of an electronic apparatus according to various embodiments.

FIG. 3 is a block diagram illustrating an example configuration of an electronic apparatus according to various embodiments. The electronic apparatus 100 may include the projector 110, the camera 120, and the processor (e.g., including processing circuitry) 130. The electronic apparatus 100 may further include a sensor 140, a user interface (e.g., including interface circuitry) 150, a communication interface (e.g., including communication circuitry) 160, memory 170, a display 180, a microphone 185, and a speaker 190. The descriptions of components illustrated in FIG. 3 that overlap with the components illustrated in FIG. 2 may not be repeated here.

The sensor 140 may include a sensor for identifying the distance from the electronic device 100 to the projection surface. For example, the sensor 140 may include a ToF sensor. However, the present disclosure is not limited thereto, and the sensor 140 may be any sensor capable of identifying the distance from the electronic device 100 to the projection surface. In addition, the processor 130 may identify the distance from the electronic device 100 to the projection surface through the camera 120.

The user interface 150 may include various interface circuitry and may be implemented as a button, a touch pad, a mouse, a keyboard, etc., or may be implemented as a touch screen that can also perform a display function and a manipulation input function. Here, the button may be a various types of buttons such as a mechanical button, a touch pad, a wheel, etc. formed in any arbitrary area such as front, side, back, etc.

The communication interface 160 may include various communication circuitry and is configured to perform communication with various types of external devices according to various types of communication methods. For example, the electronic apparatus 100 may perform communication with a content server or a user terminal device via the communication interface 160.

The communication interface 160 may include a Wi-Fi module, a Bluetooth module, an infrared communication module, a wireless communication module, and the like. Here, each communication module may be implemented in the form of at least one hardware chip.

The Wi-Fi module and the Bluetooth module perform communication using a Wi-Fi method and a Bluetooth method, respectively. When using a Wi-Fi module or a Bluetooth module, various connection information such as SSID and session keys are first transmitted and received, and various information can be transmitted and received after establishing communication connection using this. The infrared communication module performs communication according to an infrared Data Association (IrDA) communication technology which transmits data wirelessly over a short distance using infrared rays between optical light and millimeter waves.

The wireless communication module includes at least one communication chip that performs communication according to various wireless communication standards, such as Zigbee, 3rd Generation (3G), 3rd Generation Partnership Project (3GPP), Long Term Evolution (LTE), LTE advanced (LTE-A), 4th Generation (4G), 5th Generation (5G), etc.

The communication interface 160 may include a wired communication interface such as HDMI, DP, Thunderbolt, USB, RGB, D-SUB, DVI, etc.

The communication interface 160 may include at least one of a Local Area Network (LAN) module, an Ethernet module or a wired communication module that performs communication using a pair cable, a coaxial cable or an optical fiber cable.

The memory 170 may refer to hardware that stores information, such as data, in an electrical or magnetic form for access by the processor 130 or the like. To this end, the memory 170 may be implemented as at least one of the following hardware: non-volatile memory, volatile memory, flash memory, hard disk drive (HDD) or solid state drive (SSD), RAM, ROM, etc.

The memory 170 may store at least one instruction required for the operation of the electronic apparatus 100 or the processor 130. The instruction may include a code unit that instructs the operation of the electronic apparatus 100 or the processor 130, and may be written in machine language, a language that a computer can understand. The memory 170 may store a plurality of instructions for performing specific tasks of the electronic apparatus 100 or the processor 130 as an instruction set.

The memory 170 may store data, which is information in bits or bytes capable of representing characters, numbers, images, and the like. For example, the memory 170 may store a keystone correction module, an obtained image analysis module, etc.

The memory 170 may be accessed by the processor 130, and reading/writing/modifying/deleting/updating of instructions, instruction sets, or data may be performed by the processor 130.

The display 180 is configured to display content, and may be implemented as various types of displays, such as, for example, and without limitation, liquid crystal displays (LCDs), organic light emitting diodes (OLEDs) displays, plasma display panels (PDPs), and the like. The display 180 may also include a driving circuit, a backlight unit, and the like, which may be implemented in the form of a-si TFTs, low temperature poly silicon (LTPS) TFTs, organic TFTs (OTFTs), and the like. Meanwhile, the display 180 may be implemented as a touch screen combined with a touch sensor, a flexible display, a three-dimensional (3D) display, and the like.

The microphone 185 is configured to receive sound and convert it into an audio signal. The microphone 185 is electrically connected to the processor 130, and may receive sound under the control of the processor 130.

For example, the microphone 185 may be integrally formed in the direction of the top, front, side, etc. of the electronic apparatus 100. Alternatively, the microphone 185 may be formed on a remote controller, etc. that is separate from the electronic apparatus 100. In this case, the remote controller may receive sound through the microphone 185, and provide the received sound to the electronic apparatus 100.

The microphone 185 may include various components such as a microphone that collects analog sound, an amplification circuit that amplifies the collected sound, an A/D conversion circuit that samples the amplified sound and converts it into a digital signal, a filter circuit that removes noise components from the converted digital signal, etc.

The microphone 185 may be implemented in the form of a sound sensor, and may be configured in any way that is capable of collecting sound.

The speaker 190 is configured to output not only various audio data processed by the processer 130 but also various notification sounds, voice messages, etc.

As shown above, the electronic apparatus 100 may minimize and/or reduce the user's sense of heterogeneity by compensating the external area resulting from keystone correction, thereby increasing the user's sense of immersion.

Hereinafter, the operation of the electronic apparatus 100 will be described in greater detail with reference to FIGS. 4, 5, 6 and 7 (which may be referred to as FIGS. 4 to 7). For convenience of explanation, various example embodiments are described in FIGS. 4 to 7. However, the various example embodiments of FIGS. 4 to 7 may be practiced in any combination.

Figure 4:
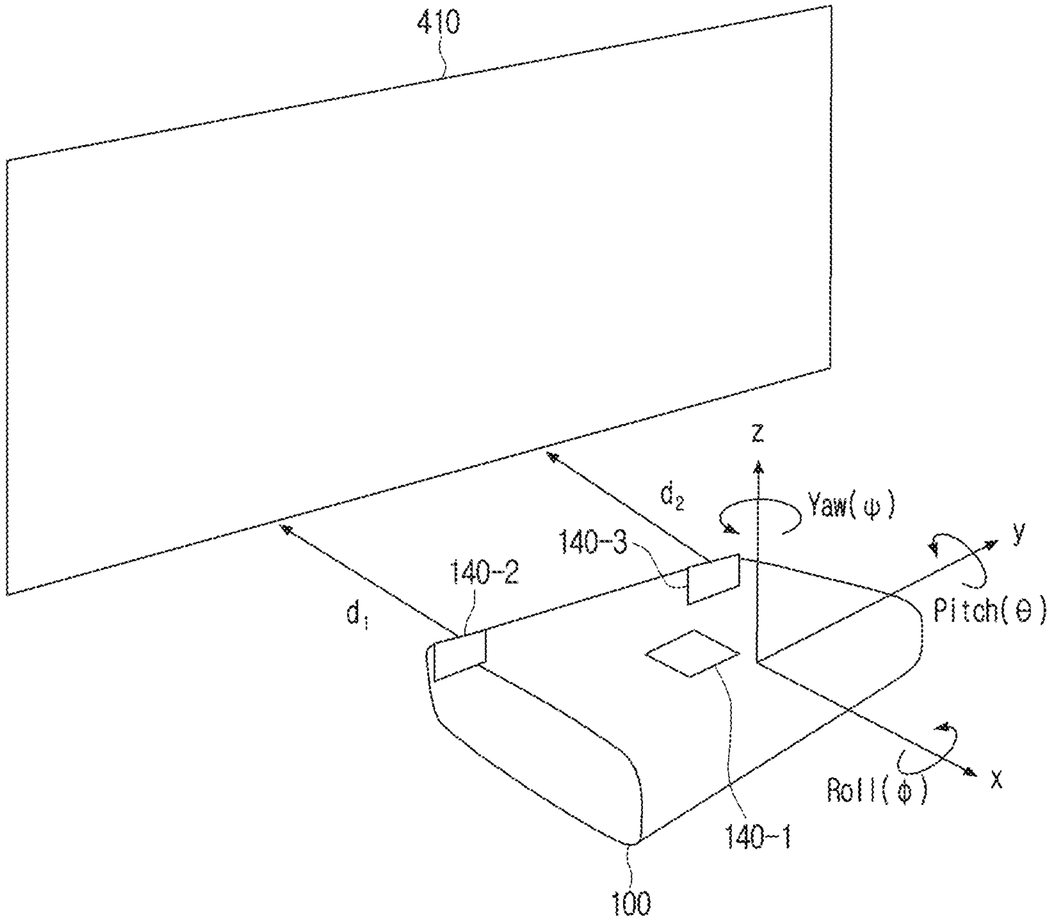
FIG. 4 is a diagram illustrating example keystone correction according to various embodiments.

FIG. 4 is a diagram illustrating example keystone correction according to various embodiments.

The processor 130 may obtain sensing information via the sensor 140, which includes an angle at which the electronic apparatus 100 is rotated with reference to the direction of gravity and an angle at which the electronic apparatus 100 is rotated with reference to the projection area 410, and may identify whether to perform keystone correction based on the obtained sensing information.

For example, the processor 130 may obtain, via an acceleration sensor 140-1, an angle at which the electronic apparatus 100 is rotated in the direction of gravity, and via a plurality of distance sensors 140-2, 140-3, an angle at which the electronic apparatus 100 is rotated with reference to the projection area, and when it is identified that the projection area (e.g., 410) is not rectangular because the electronic apparatus 100 is not placed parallel to the screen based on the obtained angles, may identify that keystone correction is to be performed. When it is identified that keystone correction is to be performed, the processor 130 may perform keystone correction on the first image based on the obtained angles. For instance, the processor 130 may obtain a projection matrix and a transformation matrix based on the posture of the electronic apparatus 100 expressed as a roll angle, a pitch angle, and a yaw angle, and the distance d1, d2 to the screen, and perform keystone correction on the first image based on the projection matrix and the transformation matrix.

However, the present disclosure is not limited thereto, and the processor 130 may identify whether to perform keystone correction based on a user command. The processor 130 may obtain sensing information and, when it is identified that keystone correction is to be performed based on the sensing information, may inform the user that it is necessary to perform keystone correction and perform keystone correction in response to the user's confirmation command.

The processor 130 may obtain sensing information when the electronic apparatus 100 is turned on, and may identify whether to perform keystone correction based on the obtained sensing information. The processor 130 may obtain sensing information when it is identified that the posture of the electronic apparatus 100 has changed while projecting an image, and may identify whether to perform keystone correction based on the obtained sensing information. In this case, the processor 130 may keep an acceleration sensor or one of a plurality of distance sensors always turned on. For example, the processor 130 may turn on the acceleration sensor to detect a change in posture, turn on the plurality of distance sensors to obtain sensing information when it is identified that the posture has changed, and identify whether to perform keystone correction based on the obtained sensing information. The processor 130 may turn on the plurality of distance sensors to obtain the angle at which the electronic apparatus 100 is rotated with reference to the screen, turn on the acceleration sensor to obtain sensing information when it is identified that the posture has changed, and identify whether to perform keystone correction based on the obtained sensing information.

In the above description, it is explained that a plurality of distance sensors are used, but the present disclosure is not limited thereto. For example, the processor 130 may photograph the screen via the camera 120, and identify whether to perform keystone correction based on the captured image.

Figure 5:
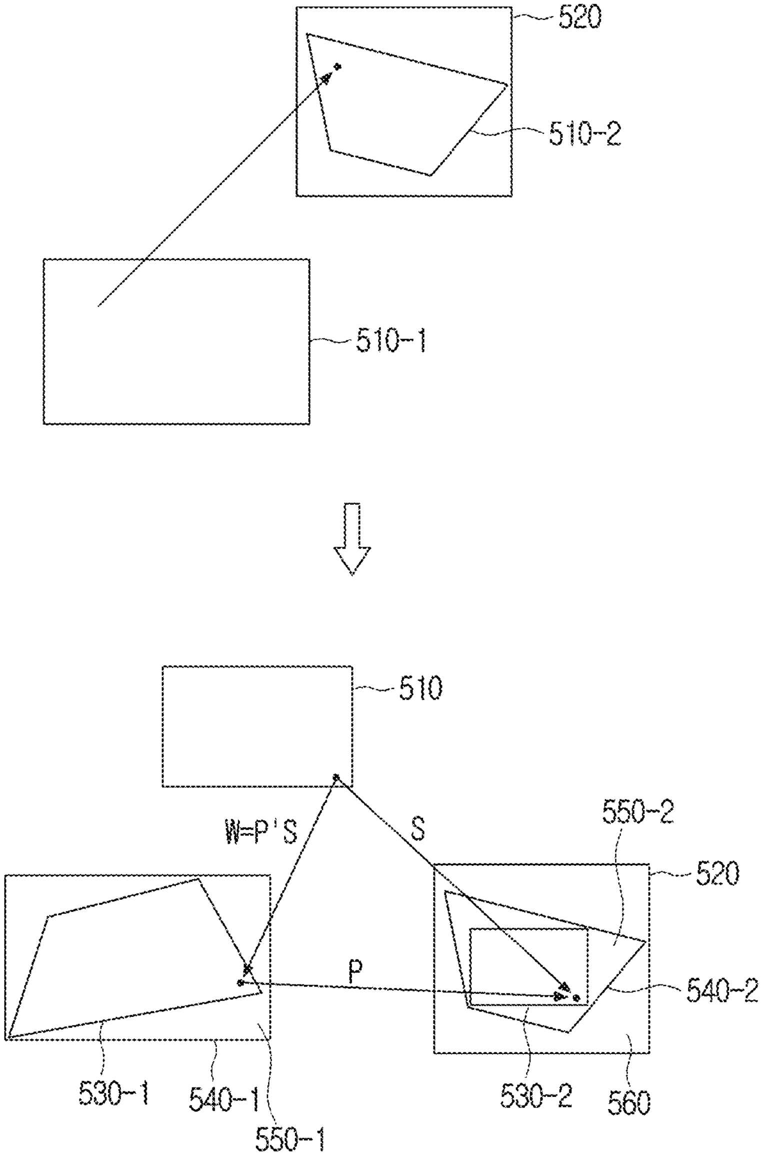
FIG. 5 is a diagram illustrating an example external area resulting from keystone correction according to various embodiments.

FIG. 5 is a diagram illustrating an example external area resulting from keystone correction according to various embodiments.

The projector 110 may project an image with a preset resolution. For example, the projector 110 may project an image with a resolution of 1920×1080. When projecting the image of the 1920×1080 resolution, the processor 130 may control the projector 110 to project the image to the projection area without scaling. Alternatively, when the image does not have the 1920×1080 resolution, the processor 130 may control the projector 110 to project the image to the projection area after scaling the image to the 1920×1080 resolution. Hereinafter, it is described that the first image is scaled to a preset resolution that can be projected by the projector 110.

When the electronic apparatus 100 is not placed parallel to the screen, the projection area may not be rectangular. For example, when the electronic apparatus 100 is not placed parallel to the screen, a first image at 510-1 may be projected to a projection area in the form of 510-2 on a screen 520, as shown at the top of FIG. 5. In this case, the processor 130 may perform keystone correction on the first image.

For example, the processor 130 may distort the first image of 510 to look like 530-1, and include the distorted first image in a portion of an area of 540-1, as shown in the lower part of FIG. 5. The area of 540-1 may correspond to a preset resolution that can be projected by the projector 110, and may be data prior to projection. In other words, the data prior to projection may include the distorted first image in the area of 530-1 out of the area of 540-1, and the second image in the remaining area 550-1 of the area of 540-1.

The processor 130 may project data prior to projection to the screen. Since the electronic apparatus 100 is not placed parallel to the screen, the area of 540-1 may be projected to the area of 540-2 on the screen 520. However, since the first image is represented using only the area of 530-1 out of the area of 540-1, it may be projected to be rectangular to the area of 530-2 on the screen 520. The second image may be projected to the area 550-2, which is an area of 540-2 excluding the area of 530-2.

Since the processor 130 adjusts the second image based on an area 560 of the screen 520 excluding the area of 540-2, the processor 130 may minimize and/or reduce differences in color, luminance, etc. between the area 550-2, which is an area of 540-2 excluding the area of 530-2 and the area 560 of the screen 520 excluding the area of 540-2 to reduce the user's sense of heterogeneity.

Figure 6:
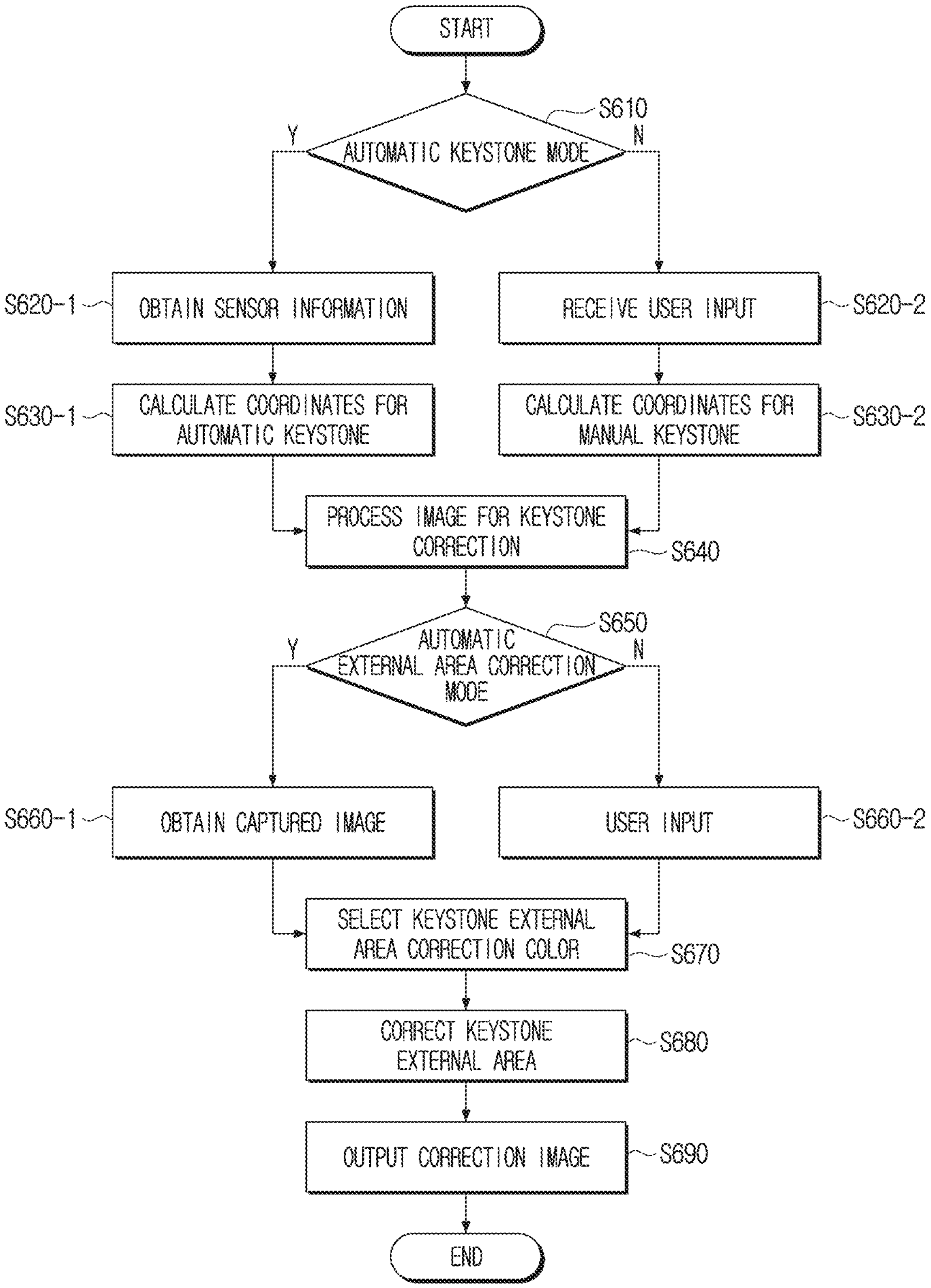
FIG. 6 is a flowchart illustrating an example method of keystone correction and external area compensation according to various embodiments.

FIG. 6 is a flowchart illustrating an example method of keystone correction and external area compensation according to various embodiments.

The processor 130 may identify whether it is in automatic keystone mode (S610).

When it is in the automatic keystone mode, the processor 130 may obtain sensor information (S620-1), and perform coordinate calculation for automatic keystone (S630-1) to perform image processing for keystone correction (S640). When it is in the automatic keystone mode, the processor 130 may receive a user input (S620-2), and perform coordinate calculation for manual keystone (S630-2) to perform image processing for keystone correction (S640).

The processor 130 may project the processed image, and identify whether it is in an automatic external area correction mode (S650).

When it is in the automatic external area correction mode, the processor 130 may obtain a captured image (S660-1) and select a keystone external area correction color (S670). On the other hand, when it is not in the automatic external area correction mode, the processor 130 may receive a user input (S660-2) and select a keystone external area correction color (S670).

The processor 130 may correct a keystone external area based on the selected color (S680), and output the corrected image (S690).

Figure 7:
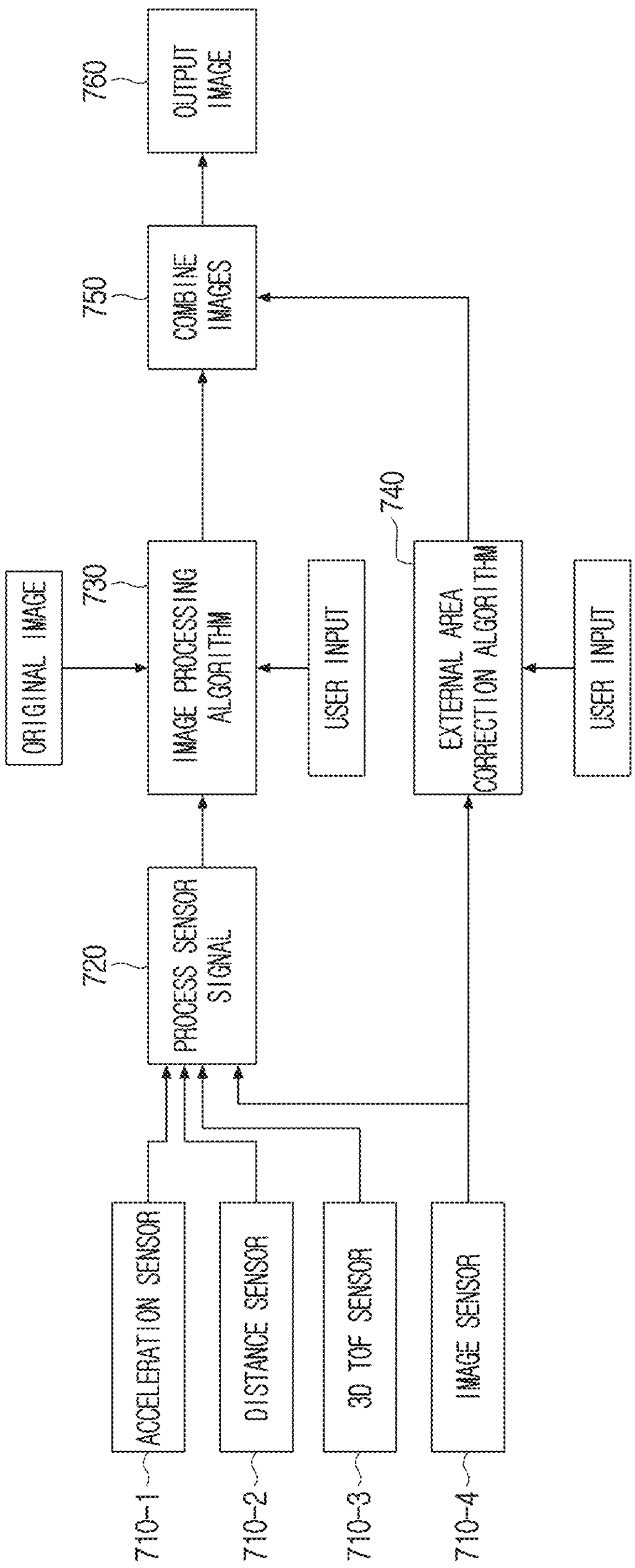
FIG. 7 is a diagram illustrating an example method of performing keystone correction and external area compensation according to various embodiments.

FIG. 7 is a view provided to explain a method of performing keystone correction and external area compensation according to an embodiment.

The processor 130 may perform keystone correction and external area compensation.

For example, the processor 130 may obtain sensor information using at least one of an acceleration sensor 710-1, a distance sensor 710-2, a 3D TOF sensor 710-3, or an image sensor 710-4, and process the obtained sensor information (720).

The processor 130 may perform image processing on the original image based on at least one of the processed sensor information or a user input (730). For example, the processor 130 may perform keystone correction on the original image based on at least one of the processed sensor information or a user input.

The processor 130 may perform external area correction based on at least one of sensor information obtained from the image sensor or a user input (S740).

The processor 130 may combine the processed original image and the corrected external area (750), and output an image (760).

Figure 8:
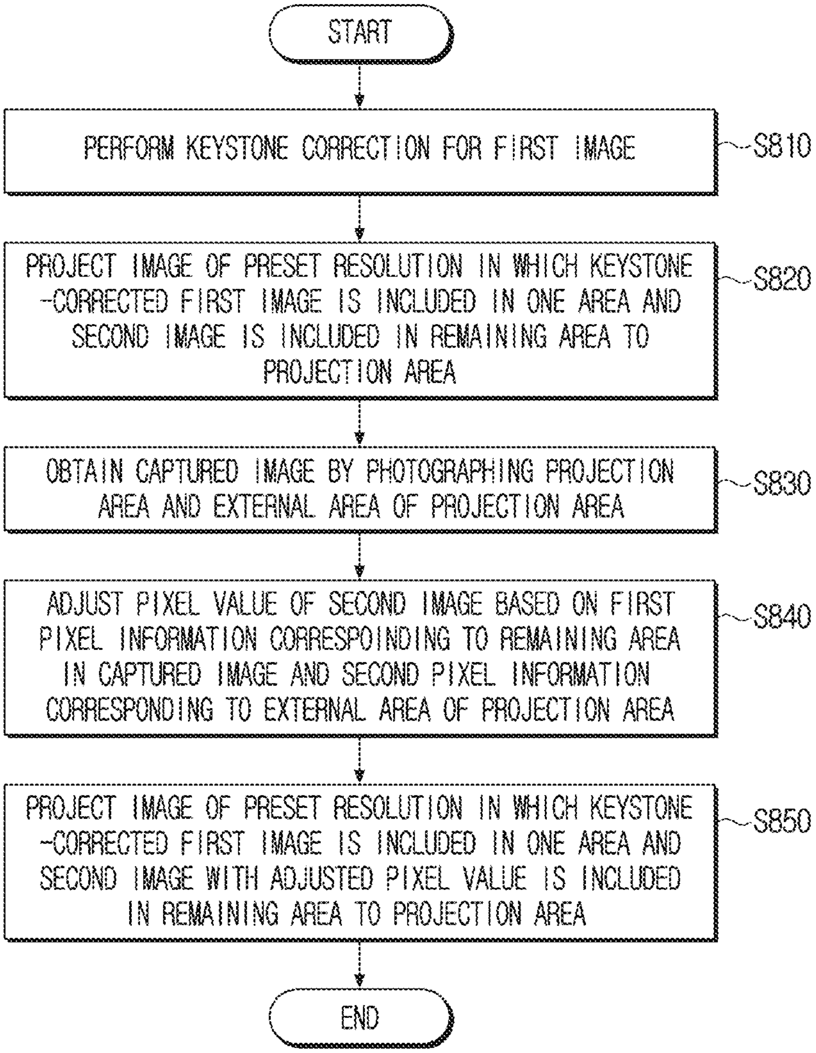
FIG. 8 is a flowchart illustrating an example method of controlling an electronic apparatus according to various embodiments.

FIG. 8 is a flowchart illustrating an example method of controlling an electronic apparatus according to various embodiments.

Keystone correction is performed on the first image (S810). An image with a preset resolution in which the keystone-corrected first image is included in one area and the second image is included in the remaining area is projected to the projection area (S820). A captured image obtained by photographing the projection area and the external area of the projection area is obtained (S830). A pixel value of the second image is adjusted based on first pixel information corresponding to the remaining area in the captured image and the second pixel information corresponding to the external area of the projection area (S840). An image with a preset resolution in which the keystone-corrected first image is included in one area and the second image with the adjusted pixel value is included in the remaining area is projected to the projection area (S850).

In addition, the preset image is an image of a preset color, and the step of adjusting (S840) may include adjusting the pixel value of the second image such that the difference between the first pixel information and the second pixel information is less than a threshold value.

The step of obtaining (S830) may include obtaining a captured image by photographing the projection area and the external area at a preset time interval, the step of adjusting (S840) may include adjusting the pixel value of the second image based on the first pixel information corresponding to the remaining area and the second pixel information corresponding to the external area in each of a plurality of captures images obtained at the preset time interval, and the controlling method may further include, when the difference between the first pixel information and the second pixel information is less than a threshold value, stop obtaining the captured image and adjusting the pixel value.

The method may further include identifying a pattern corresponding to the external area of the projection area in the captured image, and the step of adjusting (S840) may include adjusting the pixel value of the second image based on the identified pattern.

The step of adjusting (S840) may include adjusting the pixel value of the second image by further considering at least one of luminance or color of the keystone-corrected image.

The method may further include obtaining sensing information including ambient illumination of the electronic apparatus, and the step of adjusting (S840) may include adjusting the pixel value of the second image by further considering the sensing information.

The method may further include obtaining sensing information including an angle at which the electronic apparatus is rotated in the direction of gravity and an angle at which the electronic apparatus is rotated with reference to the projection area, and the step of performing (S810) may include performing keystone correction on the first image by changing the shape of the first image based on the sensing information.

The step of adjusting (S840) may include adjusting the pixel value of the second image based on a color corresponding to a user command.

Further, the projection area may be an area to which light emitted from the electronic apparatus is projected.

According to various embodiments of the present disclosure, the electronic apparatus may minimize and/or reduce the user's sense of heterogeneity by compensating the external area resulting from keystone correction, thereby increasing the user's sense of immersion.

Meanwhile, computer instructions for performing processing operations of devices according to the above-described various embodiments may be stored in a non-transitory computer-readable medium. When being executed by a processor of a specific device, the computer instructions stored in such a non-transitory computer-readable medium allows the specific device to perform processing operations in the device according to the above-described various embodiments. The non-transitory computer-readable medium refers to a medium that stores data and can be read by a device. Specific examples of the non-transitory computer-readable medium may include CD, DVD, hard disk, Blu-ray disk, USB, memory card, ROM, etc.

In addition, the components (for example, modules or programs) according to various embodiments described above may include a single entity or a plurality of entities, and some of the corresponding sub-components described above may be omitted or other sub-components may be further included in the various embodiments. Alternatively or additionally, some components (e.g., modules or programs) may be integrated into one entity and perform the same or similar functions performed by each corresponding component prior to integration. Operations performed by the modules, the programs, or the other components according to the diverse embodiments may be executed in a sequential manner, a parallel manner, an iterative manner, or a heuristic manner, or at least some of the operations may be performed in a different order or be omitted, or other operations may be added.

Although various example embodiments of the present disclosure have been shown and described above, the disclosure is not limited to the various example embodiments described above, and various modifications may be made by one of ordinary skill in the art without departing from the spirit of the disclosure including the appended claims, and such modifications are not to be understood in isolation from the technical ideas or prospect of the disclosure. It will also be understood that any of the embodiment(s) described herein may be used in conjunction with any other embodiment(s) described herein.

What is claimed is:

1. An electronic apparatus comprising:

a projector configured to project an image with a specified resolution;

a camera; and at least one processor, comprising processing circuitry, connected to the projector and the camera;

a memory storing instructions which, when executed individually and/or collectively by the at least one processor, controls the electronic apparatus to:

perform keystone correction for a first image to generate a keystone-corrected first image;

control the projector to project to a projection area an image of the specified resolution in which the keystone-corrected first image is included in one area in the projection area and a second image is included in a remaining area in the projection area;

obtain a captured image by photographing the projection area and an external area outside of the projection area through the camera;

adjust a pixel value of the second image in the remaining area based on first pixel information corresponding to the remaining area in the captured image and second pixel information corresponding to the external area outside of the projection area; and control the projector to project an image of the specified resolution in which the keystone-corrected first image is included in the one area in the projection area and the second image with the adjusted pixel value is included in the remaining area in the projection area.

2. The apparatus as claimed in claim 1, wherein the specified image incudes an image of a specified color; and wherein the memory stores instructions which, when executed individually and/or collectively by the at least one processor, controls the electronic apparatus to adjust a pixel value of the second image such that a difference between the first pixel information and the second pixel information is less than a threshold value.

3. The apparatus as claimed in claim 2, wherein the memory stores instructions which, when executed individually and/or collectively by the at least one processor, controls the electronic apparatus to:

obtain the captured image by photographing the projection area and the external area through the camera at a specified time interval;

adjust a pixel value of the second image based on the first pixel information corresponding to the remaining area and the second pixel information corresponding to the external area in each of a plurality of captured images obtained at the specified time interval; and based on a difference between the first pixel information and the second pixel information being less than a threshold value, stop obtaining the captured image and adjusting the pixel value.

4. The apparatus as claimed in claim 1, wherein the memory stores instructions which, when executed individually and/or collectively by the at least one processor, controls the electronic apparatus to:

identify a pattern corresponding to the external area outside of the projection area in the captured image; and adjust a pixel value of the second image based on the identified pattern.

5. The apparatus as claimed in claim 1, wherein the memory stores instructions which, when executed individually and/or collectively by the at least one processor, controls the electronic apparatus to adjust a pixel value of the second image further based on at last one of luminance or color of the keystone-corrected image.

6. The apparatus as claimed in claim 1, further comprising:

a sensor, wherein the memory stores instructions which, when executed individually and/or collectively by the at least one processor, controls the electronic apparatus to:

obtain sensing information including ambient illuminance of the electronic apparatus through the sensor; and adjust a pixel value of the second image further based on the sensing information.

7. The apparatus as claimed in claim 1, further comprising:

a sensor, wherein the memory stores instructions which, when executed individually and/or collectively by the at least one processor, controls the electronic apparatus to:

obtain sensing information including an angle at which the electronic apparatus is rotated with reference to a direction of gravity and an angle at which the electronic apparatus is rotated with reference to the projection area through the sensor; and perform the keystone correction for the first area by changing a shape of the first image based on the sensing information.

8. The apparatus as claimed in claim 1, further comprising:

a user interface, wherein the memory stores instructions which, when executed individually and/or collectively by the at least one processor, controls the electronic apparatus to adjust a pixel value of the second image based on a color corresponding to a user command received through the user interface.

9. The apparatus as claimed in claim 1, wherein the projection area includes an area to which light emitted from the projector is projected.

10. A method of controlling an electronic apparatus, comprising:

performing keystone correction for a first image to generate a keystone-corrected first image;

projecting to a projection area an image with a specified resolution in which the keystone-corrected first image is included in one area in the projection area and a second image is included in a remaining area in the projection area;

obtaining a captured image by photographing the projection area and an external area outside of the projection area;

adjusting a pixel value of the second image in the remaining area based on first pixel information corresponding to the remaining area in the captured image and second pixel information corresponding to the external area outside of the projection area; and projecting an image of the specified resolution in which the keystone-corrected first image is included in the one area in the projection area and the second image with the adjusted pixel value is included in the remaining area in the projection area.

11. The method as claimed in claim 10, wherein the specified image includes an image of a specified color; and wherein the adjusting comprises adjusting a pixel value of the second image such that a difference between the first pixel information and the second pixel information is less than a threshold value.

12. The method as claimed in claim 11, wherein the obtaining comprises obtaining the captured image by photographing the projection area and the external area at a specified time interval;

wherein the adjusting comprises adjusting a pixel value of the second image based on the first pixel information corresponding to the remaining area and the second pixel information corresponding to the external area in each of a plurality of captured images obtained at the specified time interval; and wherein the method further comprises, based on a difference between the first pixel information and the second pixel information being less than a threshold value, stopping obtaining the captured image and adjusting the pixel value.

13. The method as claimed in claim 10, further comprising:

identifying a pattern corresponding to the external area outside of the projection area in the captured image, wherein the adjusting comprises adjusting a pixel value of the second image based on the identified pattern.

14. The method as claimed in claim 10, wherein the adjusting comprises adjusting a pixel value of the second image further based on at last one of luminance or color of the keystone-corrected image.

15. The method as claimed in claim 10, further comprising:

obtaining sensing information including ambient illuminance of the electronic apparatus; and wherein the adjusting comprises adjusting a pixel value of the second image further based on the sensing information.

* * * * *